No. 857,581. PATENTED JUNE 25, 1907.
J. M. BOYLE.
METHOD OF MOLDING HOLLOW OBJECTS FROM CEMENT.
APPLICATION FILED JAN. 23, 1907.
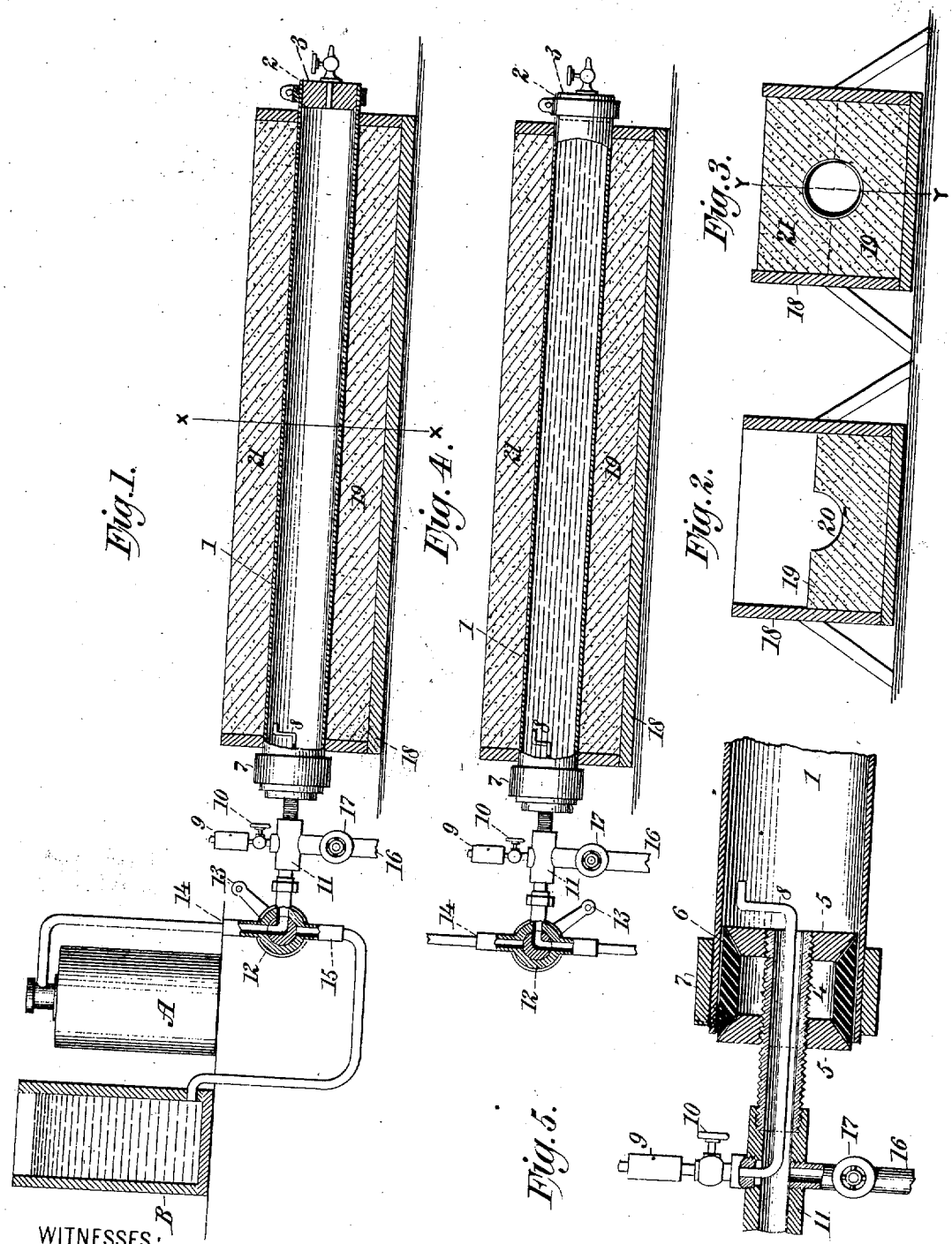
WITNESSES:
Gustave Dieterich.
Edwin F. Dieterich.
INVENTOR
James M. Boyle
BY Carl Ruyamun
his ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

METHOD OF MOLDING HOLLOW OBJECTS FROM CEMENT.

No. 857,581.        Specification of Letters Patent.        Patented June 25, 1907.

Application filed January 23, 1907. Serial No. 353,692.

*To all whom it may concern:*

Be it known that I, JAMES M. BOYLE, a citizen of the United States, residing at New York, in the county of New York and State of New York, have invented a certain new and useful Improvement in Methods of Molding Hollow Objects from Cement, of which the following is a specification.

The invention relates to the manufacture of hollow objects, conduits, etc. from plastic material, substantially as set forth in U. S. Letters Patent No. 830,204, granted to me September 4, 1906.

The invention consists in the method of making a hollow object, which consists in preparing a bed of plastic material capable of hardening, forming a matrix in said bed, placing in said matrix a flexible fluid distended core, covering said core with further plastic material, and finally removing said distending fluid from said core after said material has hardened sufficiently to retain its shape: also in embedding in said plastic material a gas distended flexible tube, substituting for said gas, liquid under pressure, and finally removing said liquid from said tube after said material has hardened sufficiently to retain its shape: also in the specific modes of practicing my said method more particularly set forth in the claims.

In the accompanying drawings—Figure 1 is a longitudinal section of a conduit mold, showing the gas distended tubular core in place and embedded in the plastic material. Fig. 2 is a cross section of the mold, with a bed of plastic material therein, having on its upper surface a matrix to receive the distended core. Fig. 3 is a cross section on the line *x x* of Fig. 1. Fig. 4 is a longitudinal section similar to Fig. 1, showing the distending gas replaced by liquid. Fig. 5 is a section showing the construction of the plug which closes one end of the tubular core and through which air and liquid are admitted.

Similar numbers of reference indicate like parts.

1 is a distensible tube of suitable dimensions to serve when distended as a core for the plastic material which forms the hollow object to be molded. Any impervious flexible material may be used for said core such as rubber covered fabric. One end 2 of the core is closed by any suitable means, such, for example, as a plug 3 of any desired construction. In the other end of the core is inserted an expansible plug, Fig. 5, constructed as follows:

Upon the threaded pipe 4, are two beveled disks 5 of metal. Circumferentially inclosing said disks is a sleeve 6 of rubber, or other elastic material. On the exterior of the tubular core 1 is placed a metal ring 7. The plug being inserted in the end of core 1, the outer disk 5 is turned in any suitable way to cause compression of the rubber sleeve 6, and hence expansion thereof radially, to compress the wall of said core between said sleeve and the outer ring 7.

Extending through the threaded pipe 4 is a pipe 8, the inner end of which within the core 1 is preferably bent radially, as shown in Fig. 5. The outer end of said pipe connects with any suitable form of gas relief valve, indicated at 9. In said pipe is a valve 10. The valve 9 is mounted on a coupling 11, which connects pipe 4 with a two-way valve 12, operated by the handle 13. When valve 12 is adjusted in one position, as for example, the position shown in Fig. 1, it establishes connection from the pipe 14 leading to any source A of gas, preferably air, under pressure, to the interior of tubular core 1. When valve 12 is adjusted in another position, as for example, the position shown in Fig. 4, it establishes connection from the pipe 15 leading to any source B of liquid, preferably water, under pressure, to the interior of tubular core 1. On coupling 11 is an escape pipe 16, having valve 17. When the valve 12 is adjusted in the position midway between those shown in Figs. 1 and 4, both pipes 14 and 15 may be closed.

In carrying my invention into practical effect, I preferably first place in a suitable mold, such for example, as the trough or box 18, a bed 19 of the chosen plastic material. This term includes cement or concrete or any plastic mass, suitable to the object in view, which hardens on setting. While said bed is still plastic I form on its upper surface by any suitable means, a matrix, groove or channel 20; the depth of which may be equal to the semidiameter of the tubular core 1, when distended. This tubular core I distend by gas, the plugs before described being inserted in the ends, and the valve 12 being placed as in Fig. 1, to establish connection with the source of gas under pressure. I may effect this distention before laying the core in the groove 20 or afterward. In either case, the distended tube substantially fits the groove. I then introduce further plastic material to about fill the mold as shown at 21. The valve 12 is then shifted to the position shown in Fig. 4, to establish connection with the liquid under pressure. The degree of pressure of said liquid should be in excess of that of the gas in the tube, so that said liquid replaces said gas, forcing said gas out of the core by the small pipe 8 to the relief valve 9, the valve 10 being opened. The liquid pressure in the core is maintained until the plastic material is set and hardened sufficiently to retain its shape, after which the valve 12 is turned to close both pipes 14, 15, and the valve 17 is opened to allow the liquid to escape. The core 1 being no longer distended may then be drawn out of the completed conduit, the plug at either end being removed for the purpose.

The principal advantage of substituting liquid for gas as the distending medium of the core, is the avoidance of leakage through the fabric of the tube. Where air, for example, is used, it will penetrate very fine pores in the fabric, which are substantially impervious to water. It is furthermore found that the liquid filled core produces a smoother surface on the interior of the conduit.

I claim:

1. The method of making a hollow object which consists in preparing a bed of plastic material capable of hardening, forming in said bed, a matrix for guiding the core, placing in said matrix a flexible fluid distended core, covering said core with further plastic material and finally removing said distending fluid from said core after said material has hardened sufficiently to retain its shape.

2. The method of making a hollow object which consists in embedding in a plastic material capable of hardening, a gas distended flexible core, then substituting for said gas, liquid under pressure, and finally removing said liquid from said core after said material has hardened sufficiently to retain its shape.

3. The method of making a hollow object which consists in preparing a bed of plastic material capable of hardening, placing a gas distended flexible core thereon, covering said core with further plastic material, substituting for said gas, liquid under pressure, and finally removing said liquid from said core after said material has hardened sufficiently to retain its shape.

4. The method of making a conduit which consists in preparing a bed of plastic material capable of hardening, forming in said bed a groove or channel, placing in said groove or channel a substantially close fitting gas distended flexible tubular core, covering said core with further plastic material, substituting for said distending gas, a liquid under pressure, and finally removing said liquid from said core after said material has hardened sufficiently to retain its shape.

In testimony whereof I have affixed my signature in presence of two witnesses.

JAMES M. BOYLE.

Witnesses:
JEANNIE HASTIE,
GERTRUDE T. PORTER.